(12) United States Patent
Hayashi et al.

(10) Patent No.: US 6,185,026 B1
(45) Date of Patent: Feb. 6, 2001

(54) MULTI-BEAM SCANNING APPARATUS

(75) Inventors: Yoshinori Hayashi; Atsushi Kawamura, both of Kanagawa-ken; Kenichi Takanashi, Chiba-ken, all of (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/366,368

(22) Filed: Aug. 3, 1999

(30) Foreign Application Priority Data

Aug. 6, 1998 (JP) ................................................. 10-222659

(51) Int. Cl.⁷ ..................................................... G02B 26/08
(52) U.S. Cl. ........................ 359/204; 359/196; 359/216; 347/233; 347/243
(58) Field of Search ..................................... 359/196, 204, 359/205, 216, 217, 218, 219; 347/232, 233, 241, 243, 244

(56) References Cited

U.S. PATENT DOCUMENTS 5,426,528  *  6/1995  Yamamoto et al. ................. 359/204
5,731,888  *  3/1998  Arai ..................................... 359/204
6,075,637  *  6/2000  Inagaki ................................ 359/204

FOREIGN PATENT DOCUMENTS 9-76562    3/1997   (JP) .

* cited by examiner

*Primary Examiner*—Darren Schuberg
(74) *Attorney, Agent, or Firm*—Greenberg Traurig LLP (57) ABSTRACT

A multi-beam scanning apparatus performs image scanning by emitting multiple beams from a plurality of light sources, which beams are deflected by a common deflector at equi-angular velocity. The beams are then condensed by a common scanning image forming lens so as to form optical spots on a scanning surface. As a result, the plurality of lines are simultaneously scanned by the beams on the scanning surface at a substantially constant velocity. Characteristics of the light sources, such as the wavelength thereof, and other factors such as writing density and desired writing width of a writing line, are arranged to eliminate differences in a written vertical line in a sub scanning direction caused by a magnification difference, regardless of the cause of such differences. In addition, the modulation frequency of the plurality of light sources is made different from each other so that writing widths of the dots written by the plurality of light sources become the same.

18 Claims, 4 Drawing Sheets

MULTI-BEAM SCANNING APPARATUS

BACKGROUND OF THE INVENTION

1. Field of the Invention

The present invention relates to a multi-beam scanning apparatus.

2. Description of Related Art

Conventional multi-beam scanning apparatuses include a plurality of light sources which are capable of being independently driven to modulate each beam according to an image signal and a plurality of beams emitted from the light sources scan a plurality of lines simultaneously on a scanning surface. The beams emitted from the light sources are deflected by a common deflector at equiangular velocity, and are then condensed by a common scanning image forming lens so as to form optical spots on the scanning surface. These optical spots are separated from each other in a sub-scanning direction. As a result, the plurality of lines are simultaneously scanned by the beams on the scanning surface at a substantially constant velocity.

In such multi-beam optical scanning apparatuses, a semiconductor laser or an LED is generally used as the light sources. The wavelength of a beam radiated from a semiconductor laser or an LED generally differs from that from other semiconductor lasers or LEDs. That is, when multiple light sources are used, there is generally some difference in wavelength of light radiated from the multiple light sources. Therefore, when a plurality of semiconductor lasers or LEDs are used as the light sources in a multi-beam scanning apparatus, the radiation wavelength of each light source is generally not the same as that of the other light sources. This difference in wavelength of the different light sources is caused by manufacturing tolerances. When the radiation wavelength of each light source is different from that of the other light sources, the magnification with a scanning image forming lens differs for each light source due to the color aberration of the lens. For the reasons described below, this difference in wavelength was not a serious problem with previous multi-beam scanning apparatuses because the image forming resolution was not high enough that the difference in wavelength would produce problem.

Figure 1:
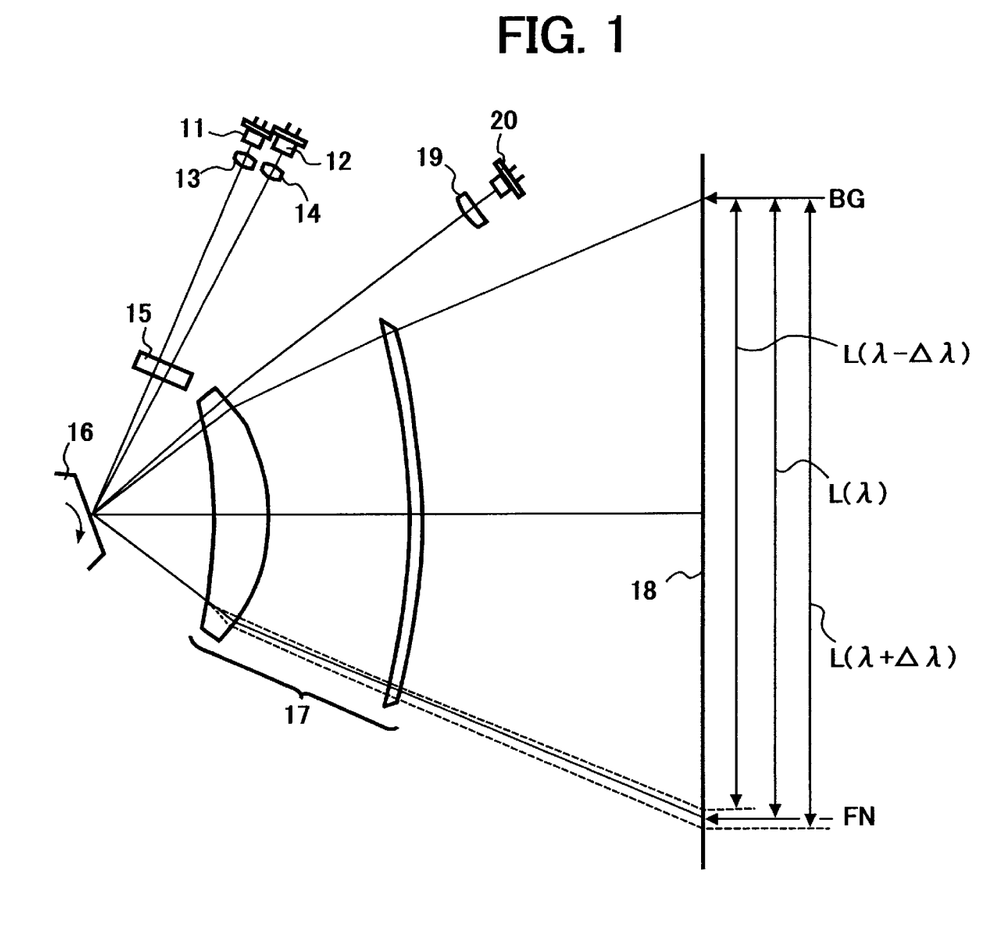
FIG. 1 is a schematic drawing of a multi-beam scanning apparatus for explaining a problem with conventional devices in that the writing end position differs between beams from a plurality of light sources.

FIG. 1 is a schematic drawing illustrating an exemplary construction of a multi-beam scanning apparatus having a plurality of light sources. In FIG. 1, reference numerals 11, 12 denote a semiconductor laser which defines a light source in this apparatus. The semiconductor lasers 11, 12 are independently driven to modulate a light beam according to an image signal, respectively. The beams emitted from the semiconductor lasers 11, 12 are converted by coupling lenses 13, 14 into beam shapes suitable for a subsequent optical system. The beams passed through the coupling lenses 13, 14 are condensed in the sub-scanning direction by a cylindrical lens 15 so as to be formed as linear images elongated in the main scanning direction.

A rotating polygon mirror which functions as a deflector 16 is arranged such that a reflective deflecting plane thereof for reflecting each beam is located in the vicinity of a location where the linear images are formed. Each beam reflected by the reflective deflecting plane of the deflector 16 is deflected at equiangular velocity as the deflector 16 rotates at a constant velocity. The deflected beams then pass through a scanning image forming lens 17 and are condensed by the effect of the scanning image forming lens 17 forming optical spots on a scanning surface 18. The optical spots on the scanning surface 18 are separated from each other in the sub-scanning direction. The scanning surface 18 is typically a photoconductive element and a latent image is written on the scanning surface 18 as a result of being scanned by the optical spots.

The beams deflected at equiangular velocity by the deflector 16 are detected by a synchronous detector including a lens 19 and an optical sensor 20 before being deflected toward a writing area of the scanning surface 18. The beams are first condensed by the lens 19 and are then detected by the optical sensor 20. The two beams are separated from each other in the main scanning direction also and are individually detected by the synchronous light detect device. The start timing of writing information on the scanning surface 18 by each beam is synchronized with each other according to the detection result of the synchronous light detector.

Optical scanning with each optical spot starts from a writing start position BG on the scanning surface 18 and information of one scanning line is written in a predetermined period of time. The length in which information of one line is written is referred to as "writing width". The writing width is generally determined as a design value for an apparatus.

The radiation wavelength of a light source is determined by the specific characteristics of a semiconductor laser used as the light source. The value of the radiation wavelength used as a design value is referred to as the desired criterion wavelength and is represented by $\lambda$. An example of the desired criterion wavelength is, for example, 780 nm, which is a typical wavelength of a semiconductor laser.

The lens effect of the scanning image forming lens 17 depends on the wavelength of a passing light. Therefore, the writing width depends on the radiation wavelength of the light source, and the writing width as a design value is determined by the desired criterion wavelength $\lambda$. Therefore, the writing width is herein represented by the criterion writing width $L(\lambda)$.

The radiation wavelength of each light source varies as described above. When the radiation wavelength of a light source is deviated from the desired criterion wavelength $\lambda$ to $(\lambda+/-\Delta\lambda)$, $\Delta\lambda$ representing a small change in the wavelength, the actual writing width $L(\lambda+/-\Delta\lambda)$ differs from the above criterion writing width $L(\lambda)$.

As described above, each beam is detected by the synchronous light detector before being deflected toward the writing area of the scanning surface 18 and thereby, the writing start position of each beam is synchronized with each other. Because the beam detect position which is determined by the synchronous light detector and the writing start position BG are relatively close to each other, the writing start position BG of each beam is substantially the same for each beam and is not deviated from each other. However, at the writing end side, because of the effect of the magnification difference due to the color aberration or chromatic aberration of the scanning image forming lens 17, the writing end position FN differs between the light sources to a degree causing a problem described next.

Figure 2:
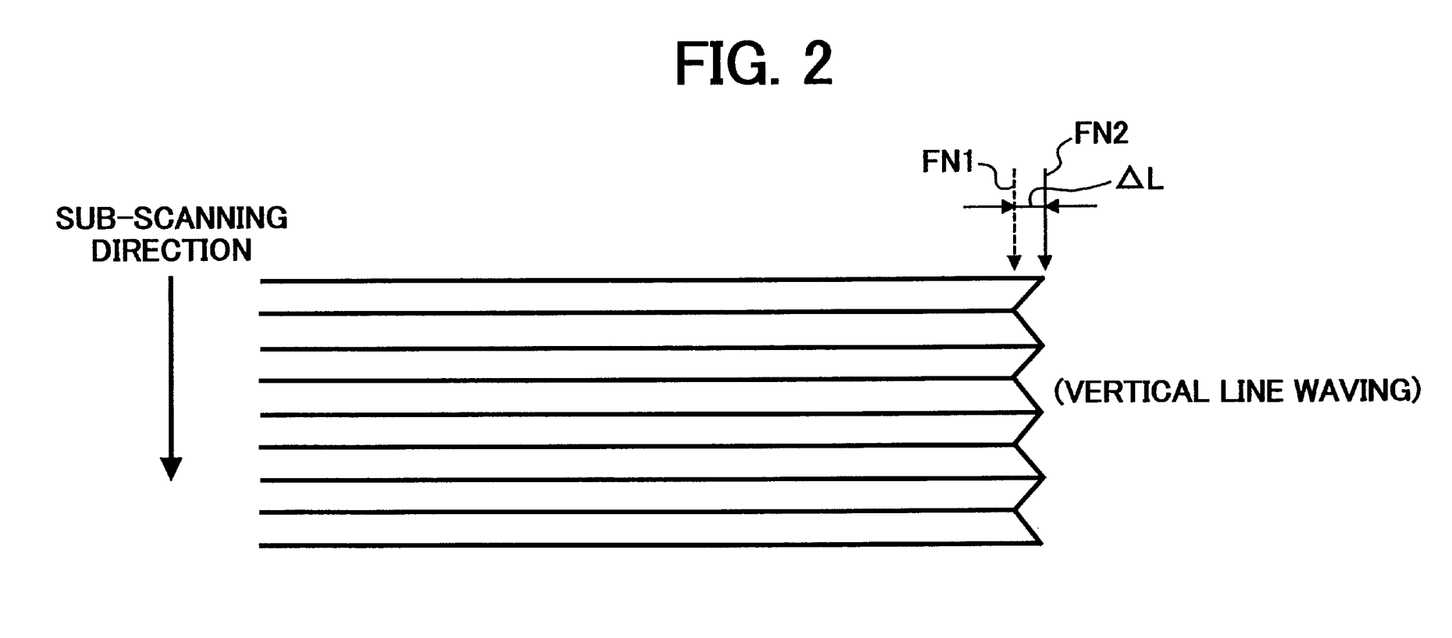
FIG. 2 is a schematic drawing for explaining a wave in a straight line in the sub scanning direction caused by the problem shown in FIG. 1.

In the apparatus of FIG. 1, in which two beams from two light sources scan the scanning surface 18, when the optical spots scan adjacent lines, respectively, as illustrated in FIG. 2, the writing end position FN1 of one of the two optical spots and the writing end position FN2 of the other optical spot are deviated from each other. Therefore, when a vertical line, i.e., a straight line in the sub-scanning direction, is written at the writing end position, the line is not written straight but instead has a non-uniform, wavy pattern as illustrated in FIG. 2.

For example, when two semiconductor lasers having the desired criterion wavelength of 780 nm are used in the scanning apparatus of FIG. 1, because the deviation of the radiation wavelength of the semiconductor lasers $\Delta\lambda$ is generally +/−20 nm, it is conceivable that the radiation wavelength of one of the semiconductor lasers is 800 nm and that of the other semiconductor laser is 760 nm. When the criterion writing width L for the semiconductor laser having the wavelength of 780 nm is assumed to be 216 mm, the writing width L may deviate by about 70 µm between the semiconductor lasers having the radiation wavelengths of 800 nm and 760 nm, respectively.

When the writing resolution is 400 dpi (dot-per-inch), the size of one dot as a unit of writing information with optical scanning is about 63.5 µm in diameter. In this case, because the above deviation of 70 µm from dot locations in the writing end position of the two beams is about the same, the above-described wave of a straight line is not recognizable.

Recently, the demand for improving the writing resolution has increased and the higher writing resolution, such as 600 dpi and 1200 dpi, is now being realized. When a vertical straight line is written in the sub-scanning direction with the writing resolution of 600 dpi, the size of one dot being 40 µm in diameter, the above deviation amount of 70 µm as the maximum amplitude of the wave of a straight line is about twice as large as the size of the writing dot and therefore, the wave in a desired straight line starts to become recognizable.

The inventors of the present invention discovered that the wave in the desired straight line starts to be recognizable when the maximum amplitude of the wave of a straight line is more than about twice as large as the size of one writing dot.

The magnification difference in a scanning image forming lens can be caused by other factors besides the color aberration of the lens. As described above, the plurality of beams from the plurality of light sources deflected by the deflector are separated from each other in the sub-scanning direction. Accordingly, the positions in the scanning forming lens where the beams pass are different. This difference also causes the magnification difference between the beams, which is herein called the magnification difference due to the difference in the passing position in the scanning image forming lens.

The above magnification difference between beams from a plurality of light sources caused by chromatic or color aberration of a scanning image forming lens can be corrected by making the lens colorless, but this increases the cost of the scanning image forming lens. Further, when the scanning image forming lens includes a plastic lens, correction of the color aberration is difficult because there are only a few types of plastic materials suitable for use in forming the optical lens.

In a specific conventional prior art device described in JP 9-76562, the wavelengths of two optical elements used as light sources are required to be within 12 nm of each other so as to minimize vertical line waving as seen in FIG. 2 of the present application so that the line waving is not so visible. In order to achieve this wavelength variation of only 12 nm is to have a very precise arrangement of the light sources and apparatus elements. More specifically, the wavelength for each specific light source must be accurately measured and then compared to the wavelength of other light sources to find a suitable match that makes a difference between the wavelengths of the selected two light sources less than 12 nm. It is extremely difficult and time-consuming to find two light sources that have a wavelength difference of less than the required difference of 12 nm. Thus, this solution to the problem of the waviness in the vertical line is very difficult, time consuming and makes the assembly process very expensive.

SUMMARY OF THE INVENTION

In order to overcome the problems described above, preferred embodiments of the present invention provide a multi-beam scanning apparatus in which a magnification difference between beams due to the color aberration of a scanning image forming lens is substantially eliminated and thereby, a waviness of a desired straight line in the sub-scanning direction, which waviness is caused by the magnification difference between the beams, is also substantially eliminated.

The preferred embodiments of the present invention further provide a multi-beam scanning apparatus in which the magnification difference is substantially eliminated regardless of whether the magnification difference is caused by the color aberration of the scanning image forming lens or the difference in the position in the scanning forming lens where each beam of a plurality of light sources passes through.

According to preferred embodiments of the invention, in addition to considering the wavelengths of the multiple light sources used in a multi-beam scanning apparatus, the color aberration and the dot density are considered and corrected, so that there is no waviness in a line written in the sub scanning direction.

More specifically, according to one preferred embodiment of the present invention, a multi-beam scanning apparatus or an image forming apparatus includes a plurality of light sources arranged to be independently driven to modulate light according to an image signal and to emit a plurality of beams, a rotating deflector arranged to receive the plurality of beams emitted from the plurality of light sources and to deflect the beams via a reflective deflecting surface thereof, an image scanning forming lens arranged to receive the deflected beams from the deflector and to condense the deflected beams so as to form optical spots on a scanning surface such that the spots are separated from each other in the sub-scanning direction and such that a plurality of lines on the scanning surface are simultaneously scanned via the optical spots at a substantially constant velocity as the deflector rotates; wherein a writing angle corresponding to a writing width of the lines written on the scanned surface is $\theta$(rad), a writing density of the dots written on the scanned surface is $\delta$(dpi), a maximum difference of wavelength between the plurality of light sources is $\Delta\lambda$, and a desired writing width corresponding to the writing angle $\theta$ with the beam having the desired wavelength $\lambda$ is $L(\lambda)$, and the plurality of light sources are such that the value of $\Delta K$, which is defined by $\Delta K=(1/\theta)(dL/d\lambda)$, and the maximum difference $\Delta\lambda$ of the wavelength between the plurality of light sources satisfy the following condition: $0<\Delta\lambda/[25.4\times 2/\{\delta\times\Delta K\times\theta\}]\leq 1$.

According to another preferred embodiment of the present invention a multi-beam scanning apparatus or an image forming apparatus includes a plurality of light sources arranged to be independently driven to modulate light according to an image signal and to emit a plurality of beams, a rotating deflector arranged to receive the plurality of beams emitted from the plurality of light sources and to deflect the beams via a reflective deflecting surface thereof, an image scanning forming lens arranged to receive the deflected beams from the deflector and to condense the deflected beams so as to form optical spots on a scanning surface such that the spots being separated from each other in the sub-scanning direction and such that a plurality of lines on the scanning surface are simultaneously scanned via the optical spots at a substantially constant velocity as the deflector rotates, wherein modulation frequencies of the at least two light sources are different from each other so that the writing widths of the at least two light sources is substantially equal.

In a further preferred embodiment, a method of forming a multi-beam scanning apparatus includes the steps of providing a plurality of light sources for emitting a plurality of beams, arranging a rotating deflector to receive the plurality of beams emitted from the plurality of light sources and to deflect the beams via a reflective deflecting surface thereof, arranging an image scanning forming lens to receive the deflected beams from the deflector and to condense the deflected beams so as to form optical spots on a scanning surface such that the spots being separated from each other in the sub-scanning direction and such that a plurality of lines on the scanning surface are simultaneously scanned via the optical spots at a substantially constant velocity as the deflector rotates, and selecting the plurality of light sources such that a maximum difference $\Delta\lambda$ of wavelength between the plurality of light sources satisfies the following condition: $0<\Delta\lambda/[25.4\times2/\{\delta\times\Delta K\times\theta\}]\leq 1$, wherein a writing angle corresponding to a writing width of the lines written on the scanned surface is $\theta(\text{rad})$, a writing density of the dots written on the scanned surface is $\delta(\text{dpi})$, a maximum difference of wavelength between the plurality of light sources is $\Delta\lambda$, and a desired writing width corresponding to the writing angle $\theta$ with the beam having the desired wavelength $\lambda$ is $L(\lambda)$, and the plurality of light sources are such that the value of $\Delta K$, which is defined by $\Delta K=(1/\theta)(dL/d\lambda)$.

In another preferred embodiment of the present invention, a method of multi-beam scanning includes modulating light from at least two different light sources according to an image signal to emit a plurality of beams, deflecting the plurality of beams via a reflective deflecting surface, condensing the deflected beams so as to form optical spots on a scanning surface such that the spots are separated from each other in a sub-scanning direction and such that a plurality of lines on the scanning surface are simultaneously scanned via the optical spots at a substantially constant velocity as the deflector rotates, and changing modulation frequencies of light from the at least two light sources so that modulation frequencies of light from the at least two different light sources are different from each other such that the writing widths generated by light from the at least two light sources is substantially equal.

These and other features, advantages and elements of the present invention will be apparent from the following detailed description of the preferred embodiments with reference to the accompanying drawings as described below.

BRIEF DESCRIPTION OF THE DRAWINGS

A more complete appreciation of the present invention and many of the attendants advantages thereof will be readily obtained by reference to the following detailed description when considered in connection of the accompanying drawings, wherein:

FIG. 3($a$) is a schematic drawing of a part of a multi-beam scanning apparatus according to a preferred embodiment of the present invention;

FIG. 3($b$) is a diagram for explaining a feature of the preferred embodiment shown in FIG. 3($a$)

DETAILED DESCRIPTION OF PREFERRED EMBODIMENTS

Referring now to the accompanying drawings, wherein like reference numerals designate identical or corresponding parts throughout the several views, preferred embodiments of the present invention are described.

A multi-beam scanning apparatus according to a preferred embodiment of the present invention includes a plurality of light sources which are independently driven to modulate light according to an image signal. A plurality of beams emitted from the light sources are deflected by a common deflector at equiangular velocity. The deflected beams are condensed by a common scanning image forming lens so as to form optical spots on a scanning surface, the spots being separated from each other in the sub-scanning direction, and a plurality of lines on the scanning surface are simultaneously scanned with the optical spots at a substantially constant velocity as the deflector rotates.

A semiconductor laser and an LED or other light device can be used as the light sources. A semiconductor laser is preferable to be used as the light sources. A rotating polygonal mirror can be used as the deflector. Other suitable deflectors may also be used, such as a flat rotating mirror having a reflecting surface on both sides or one side of the flat mirror.

In the above scanning apparatus of preferred embodiments of the present invention, various characteristics of the elements of the scanning apparatus are selected to correct color aberration, correct dot density problems and to correct differences in wavelength of light sources used therein so as to prevent waviness of a line written by the apparatus in a sub scanning direction.

More specifically, when a writing angle corresponding to a writing width is $\theta(\text{rad})$, writing density is $\delta(\text{dpi})$, the maximum difference of the wavelength between the plurality of light sources is $\Delta\lambda$, and the desired writing width corresponding to the writing angle $\theta$ with the beam having the desired wavelength $\lambda$ is $L(\lambda)$, the writing density $\delta$ is equal to or greater than 600 dpi, i.e., 600 dpi, 1200 dpi, 2400 dpi and greater than 2400 dpi. Further, the above plurality of light sources are such that the value of $\Delta K$, which is defined by $\Delta K=(1/\theta)(dL/d\lambda)$, and the above maximum difference $\Delta\lambda$ of the wavelength between the plurality of light sources satisfy the following condition:

$$0<\Delta\lambda/[25.4\times2/\{\delta\times\Delta K\times\theta\}]\leq 1. \tag{1}$$

The factor $dL/d\lambda$ relates to correction of color aberration. This correction can be achieved in many different ways according to preferred embodiments of the present invention. First, the type of plastic material used for forming the lenses used in the scanning apparatus is selected to have an abbe value of greater than about 40 and less than about 80 so as to achieve a very small distersion thereby minimizing color aberration.

In addition, the first and second lenses of the image scanning forming lens may each be formed such that a thickness $t_1$ at the center portion of each lens and a thickness $t_2$ at the edge portion of each lens satisfies the condition: $0.3 \leq t_2/t_1 \leq 1.7$. This arrangement also corrects color aberration.

In addition, color aberration may be corrected by arranging one of the first and second lenses to have either negative power or positive power, and arranging the other of the first and second lenses to have the other of negative power and positive power. That is, when the first lens has positive power, the second lens has negative power, and, when the first lens has negative power, the second lens has positive power.

Furthermore, color aberration may also be corrected by setting a distance $D_1$ from a reflective deflecting surface of the optical deflector to a second surface of the first lens located closest to the optical deflector, and a distance $D_2$ from the reflective deflecting surface of the optical deflector to a surface to be scanned, such that the following condition is satisfied: $D_1/D_2 \geq 0.25$.

Also, the color aberration can be corrected by setting an angle of impingement $\theta_1$, measured relative to the optical axis, of a light beam impinging on the first surface of the first lens located closest to the optical deflector, and an angle of impingement $\theta_2$, measured relative to the optical axis, of a light beam impinging on the surface to be scanned, such that the following condition is satisfied: $\theta_2/\theta_1 \geq 0.4$.

As $dL/d\lambda$ for defining the above factor $\Delta K$, the change of the writing width L when the wavelength is deviated by about 1 mm from the used criterion wavelength $\lambda$ can be used as a target. Of course, other targets that are slightly larger or smaller than 1 mm can be used.

The condition (1) defines in a specific and reliably way the difference of the writing width of beams from two light sources, in which the maximum wavelength difference between the two light sources caused by the color aberration of a scanning image forming lens becomes $\Delta\lambda$, which is less than or equal to about two times of the size of one writing dot, that is, the condition by which the above-mentioned waviness in a straight line in the sub-scanning direction is substantially eliminated such that the wave is not recognizable and the line in the sub-scanning direction appears completely straight.

When $(1/\theta)(dL/d\lambda)$ is substituted for $\Delta K$ in the condition (1), the condition (1) becomes $\Delta\lambda \cdot (dL/d\lambda)(\delta/25.4) \leq 2$, wherein $\Delta\lambda(dL/d\lambda))$ corresponds to the difference $\Delta L$ of the writing width L corresponding to the above-described maximum wavelength difference $\Delta\lambda$ (see FIG. 2).

Accordingly, if $\Delta\lambda(dL/d\lambda)(\delta/25.4)$ is rewritten as $\Delta L$ ($\delta/25.4$), this represents the ratio of the difference $\Delta L$ of the writing width L relative to one writing dot when the writing resolution is $\delta$. Therefore, the condition (1) represents the condition that the difference $\Delta L$ of the writing widths L becomes smaller than two times of the size of one writing dot which, as noted above, was discovered by the inventors to reliably prevent any waviness from being anything more than just negligible, invisible differences which do not create any viewable waviness.

Because the above factor $\Delta\lambda$ represents the maximum difference of the wavelength between the plurality of light sources, when there are more than 3 light sources, the difference in the wavelength between the light sources never exceeds the maximum wavelength difference $\Delta\lambda$. Therefore, even when more than three lines are simultaneously scanned with three or more light sources, the above difference $\Delta L$ of the writing widths never exceeds two times of the size of one writing dot so as to make sure that any waviness which does occur is so tiny that it is not viewable even at much higher image resolution of 600 dpi, 1200 dpi, 2400 dpi or greater than 2400 dpi.

According to another feature of preferred embodiments of the present invention, when the plurality light sources include more than two light sources, the modulation frequency of at least two light sources may be made different from each other so that the writing widths generated by the two light sources become substantially the same.

When a time for writing one dot with an optical spot is T, the modulation frequency of a corresponding light source for the optical spot is defined by 1/T. When the length of one line which is written with the optical spot, i.e., the aforementioned desired writing width L, corresponds to N dots, the time necessary for writing the effective writing width L is N×T.

When the two light sources, for example, light sources 1 and 2, having the same modulation frequency, are used, suppose that the actual writing widths of the light sources 1 and 2 differ, i.e., L (light source 1) is not equal to L (light source 2), because of the magnification difference between beams from the two light sources which is caused by the color aberration of the scanning image forming lens or the difference in the position in the scanning image forming lens where respective beams from the two light sources pass.

At this time, if the following relationship is true: L(light source 2)/L(light source 1)=s, when the time T(light source 1) for a beam from the light source 1 to write one dot is made s times the time T(light source 2) for a beam from the light source 2 to write one dot, then the diameter of one dot written by the beam from the first light source 1 is s times of that of one dot written by the beam from the second light source 2 in the main scanning direction. Therefore, irrespective of the existence of the above magnification difference, whatever its cause, the writing widths of the beams from the above two light sources can be made the same. That is, when the modulation frequency of the light source 2 is 1/T(light source 2), the modulation frequency of the light source 1 is made 1/{s×T(light source 2)}.

It may not be possible to set the modulation frequency of the light source 1 precisely to 1/{s×T(light source 2)}. However, by substantially satisfying the above condition, the actual writing widths by the light sources 1 and 2 can be made substantially the same.

Thus, according to preferred embodiments of the present invention, the magnification difference between beams from a plurality of light sources, which may be caused by the color aberration of the optical image forming lens or differences in the positions where the beams of the light sources pass, can be corrected by adjusting the modulation frequency of the light sources irrespective of the cause of the magnification difference.

The above-described correction of the magnification difference by adjustment of the modulation frequency of the light sources can be also applied to a multi-beam scanning apparatus satisfying the above condition (1).

In addition, when the magnification difference is caused mainly by the color aberration of the scanning image forming lens, because the difference $\Delta L$ of the writing widths L can be known beforehand based upon the radiation wavelength of the light sources, the magnification difference between beams from at least two light sources can be substantially eliminated by making the modulation frequencies of the at least two light sources different according to the wavelength of each beam from the light sources.

According to another feature of preferred embodiments of the present invention, the above adjustment of the modulation frequency of the light sources can be achieved by providing a device to determine the modulation frequency for each light source.

Although in the conventional devices, a device such as a clock generator or frequency modulator was used, such device only frequency modulated in order to have fixed writing width each time in a single beam device and in multi-beam device, one sensor and one clock generator frequency modulated all light sources (2 or more) to make sure start point is the same each time. In these conventional devices, it was not possible to eliminate or reduce waviness of the straight line because the frequency modulation for all of the light beams was the same and there was no frequency modulation of each light source independently and differently from other light sources.

Thus, this preferred embodiment of the present invention makes modulation frequency of two or more light sources different from each other and in a way that ensures that the writing position at the end of a writing line is the same for the multiple light sources so as to eliminated waviness.

In one example of this preferred embodiment of the present invention, a pair of optical sensors may preferably be provided at both of the writing start side and the writing end side of the scanning surface. The modulation frequency for each light source is determined according to a time for a beam from each light source to move between the sensors.

According to preferred embodiments of the present invention, the scanning image forming lens used in any of the above preferred embodiments can include one or more plastic lenses. Plastic lenses are suitable for use in a scanning image forming lens, because materials of the plastic lenses are generally inexpensive. As a result, the scanning image forming lens can be manufactured for relatively low cost by using one or more plastic lenses, and in addition, special lens surfaces such as a non-spherical surface can be easily formed of the plastic lenses. However, there are few plastic materials suitable for use in optical lenses. More specifically, plastic lenses in which a magnification difference caused by a chromatic or color aberration can be corrected by achromatization are few. Therefore, preferred embodiments of the present invention are effectively applied to multi-beam scanning apparatuses using plastic lenses for the scanning image forming lens.

Further, the plurality of light sources may include two light sources, or three or more light sources. When more than three light sources are used, the above adjustment of the modulation frequency for each light source is preferably applied to two light sources producing the largest difference of the writing width.

Now, specific examples of preferred embodiments of a multi-beam scanning apparatus according to the present invention are described hereinafter. The multi-beam scanning apparatus of each preferred embodiment preferably has an optical arrangement as illustrated in FIG. 1. Light beams coupled by the coupling lenses 13, 14 can be parallel or weak converging or diverging. In the following examples of preferred embodiments, the coupling lens 13, 14 act as collimating lenses and convert the light beams from the light sources 11, 12 to parallel light beams.

The scanning image forming lens 17 preferably includes two pieces of lenses. The lens at the deflector 16 side is herein referred to as the first lens and the lens at the scanning surface side is herein referred to as the second lens. Both surfaces of the first lens are co-axially non-spherical. A co-axially non-spherical surface is defined by giving R, K, $A_4$, $A_6$, $A_8$, $A_{10}$ . . . in the following known formula:

$$X=r^2/[R+R\sqrt{\{1-(1+K)r^2/R^2\}}]+A_4r^4+A_6r^6+A_8r^8+A_{10}r^{10}+ \ldots$$

wherein the coordinate in the optical axis is X, the coordinate in the orthogonal direction to the optical axis is r, the paraxial radius of curvature is R, the cone constant is K, and the coefficient of higher degree is $A_4$, $A_6$, $A_8$, $A_{10}$, . . .

The data of the first lens is as follows:
The refractive index of plastic material: N=1.52441 (wavelength: 780 nm)
The surface interval on the optical axis: D=22.0 mm
The co-axial non-spherical shape of the first surface (the deflector side): R=−179.1, K=−1.267, $A_4$=1.702E-7, $A_6$=−3.926E-12, $A_8$=−2.564E-13, $A_{10}$=4.493E-17, $A_{12}$=1.6923E-21
The co-axial non-spherical shape of the second surface (the scanning surface side): R=−62.7, K=−0.041, $A_4$=5.540E-7, $A_6$=−4.239E-11, $A_8$=1.994E-14, $A_{10}$=−3.779E-17

Both surfaces of the second lens are non-arc in the main scanning cross section, which is the virtual cross section orthogonal to the sub-scanning direction and including the optical axis.

A non-arc shape is defined by giving Rm, Km, $a_4$, $a_6$, $a_8$, $a_{10}$ . . . in the following known formula:

$$X=Y^2/[Rm+Rm\sqrt{\{1-(1+Km)r^2/Rm^2\}}]+a_4r^4+a_6r^6+a_8r^8+a_{10}r^{10}+ \ldots$$

wherein X is the coordinate in the axial direction, Y is the coordinate in the main scanning direction, Rm is the paraxial radius of curvature in the main scanning cross section, Km is a cone constant, and $a_4$, $a_6$, $a_8$, $a_{10}$ . . . are coefficient of high degree for the non-spherical surface.

The radius of curvature: rs in the sub-scanning cross section, which is the virtual cross section orthogonal to the main scanning direction, is defined by giving Rs, $b_2$, $b_4$, $b_6$, $b_8$, $b_{10}$, $b_{12}$ in the following polynomial:

$$rs=Rs+b_2Y^2+b_4Y^4+b_6Y^6+b_8Y^8+b_{10}Y^{10}+b_{12} \ldots$$

wherein Y is the coordinate in the sub-scanning cross section, the above radius of curvature at the axis (Y=0) is Rs, and the coefficient is $b_2$, $b_4$, $b_6$, $b_8$, $b_{10}$, $b_{12}$ . . .

The data of the second lens is as follows:
The refractive index of plastic material: N=1.52441 (wavelength: 780 nm)
The surface interval on the optical axis: D=3.5 mm
The non-spherical shape of the third surface (the deflector side): Rm=−340.0, Km=−85.0, $a_4$=−6.765E-8, $a_6$=−7.694E-12, $a_8$=−1.163E-15, $a_{10}$=−1.593E-19
The radius of curvature of the third surface in the sub-scanning cross section:
Rs=−31.6, $b_2$=−1.506E-3, $b_4$=−5.750E-7, $b_6$=−5.131E-11, $b_8$=1.043E-14, $b_{10}$=−6.061E-18, $b_{12}$=6.959E-22
The non-spherical shape of the fourth surface (the scanning surface side):
Rm=−680.0, Km=4.805, $a_4$=−1.633E-7, $a_6$=−7.019E-12, $a_8$=−2.358E-16, $a_{10}$=1.879E-20
The radius of curvature of the fourth surface in the sub-scanning cross section:
Rs=−16.68, $b_2$=$b_4$=b6=$b_8$=$b_{10}$=$b_{12}$=0

When the principal light of the deflected light flux from the light source 11 coincides with the optical axis of the scanning image forming lens 17 when viewed in the sub-scanning direction, the distance between the starting point of deflection by the deflector 16 and the first surface is 45.8, the interval between the second and third surfaces on the optical axis is 52.1, and the interval between the fourth surface and the scanning surface on the optical axis is 105.5.

In the above description, E-8 means $10^{-8}$ and is applied to immediately preceding value. The unit of the values having dimension for length is mm.

Now, an example of a further preferred embodiment is described hereinafter.

When the scanning image forming lens 17 has the above data and is formed with plastic material, if the wavelength deviates 1 nm from the used criterion wavelength: 780 nm, the power changes by about 0.00002.

When the writing angle: θ=1.285 rad, the desired writing width in the design: L (λ=780 nm)=216 mm, then, because (dL/dλ))=0.0033981, ΔK=0.0026445.

When the writing resolution is D=1200 dpi, the wavelength difference Δλ satisfying the condition (1) is Δλ≦12.4 nm. Accordingly, if Δλ=10 nm, the left member of the condition (1) is 0.8, and thus the condition (1) is well satisfied.

Accordingly, by using the light sources 11, 12 having the radiation wavelength of 780 nm and the wavelength difference of maximum 10 nm, waving of a vertical line in the sub-scanning direction can be suppressed to a hardly recognizable level regardless of whether the magnification difference is due to the color aberration of the scanning image forming lens or some other cause.

As described above, the multi-beam scanning apparatus according to the first preferred embodiment of the present invention includes the plurality of light sources 11, 12 which are independently driven to modulate light according to an image signal. A plurality of beams emitted from the light sources 11, 12 are deflected by the common deflector 16 at equiangular velocity. The deflected beams are condensed by the common scanning image forming lens 17 to form optical spots on the scanning surface 18, separated from each other in the sub-scanning direction, and a plurality of lines on the scanning surface 18 are simultaneously scanned with the optical spots at substantially the constant velocity as the deflector 16 rotates.

In the above scanning apparatus of the present invention, when the writing angle θ corresponding to the effective writing width is 1.285 rad, the writing density δ is 1200 dpi, the maximum difference Δλ the wavelength of the plurality of light sources is 10 nm, the desired writing width L(λ) corresponding to the angle θ for the beam having the used desired wavelength λ of 780 nm is 216 mm, then, the writing density δ is equal to or greater than 600 dpi, i.e., δ≧600 dpi, and the value of ΔK, which is defined by ΔK=(1/θ)(dL/dλ), and the above maximum difference Δλ in the wavelength of the plurality of light sources satisfy the condition (1).

Further, as described above, the scanning image forming lens 17 is preferably constructed of two plastic lenses, two light sources 11, 12 are used and semiconductor lasers are used as the light sources 11, 12.

Generally, a wavelength variation in the semiconductor laser having the radiation wavelength of 780 nm is +/−20 nm. However, a wavelength variation of a group of semiconductor lasers made in the same wafer is +/−1.1 nm at +/−4σ (σ: the standard deviation), and the wavelength difference of only 2.2 nm is generated in the range of +/−4σ, which is well within the range to satisfy the condition (1).

In the above-described preferred embodiment, as the light sources 11, 12, the semiconductor lasers having the radiation wavelength of about 780 nm are preferably used. Because the wavelength variation is about +/−20 nm in the semiconductor lasers with the wavelength of 780 nm, semiconductor lasers having the maximum difference Δλ in the radiation wavelength smaller than 12.4 μm is selected for the light sources 11, 12.

In the above scanning image forming lens having the above-described characteristics, when the radiation wavelength difference in semiconductor lasers having the radiation wavelength of 780 nm is assumed to be 20 nm, and if a semiconductor laser having the radiation wavelength of 760 nm is used for the light source 11 and a semiconductor laser having the radiation wavelength of 800 nm as the light source 12, if the writing width of 216 mm is set for the semiconductor laser having the radiation wavelength of 780 nm, then, the writing width with the semiconductor laser having the radiation wavelength of 760 nm becomes 215.944 nm, generating the magnification difference of −0.026%. Likewise, for a semiconductor laser having the radiation wavelength of 800 nm, the writing width becomes 216.012, thus the magnification difference of 0.006% is generated.

The above magnification difference of −0.026% causes the writing end positions of optical spots to be deviated by 68 μm from each other in the main scanning direction. When the writing resolution is 1200 dpi, this deviation is greater than two dots, because the size of one dot is 21.2 μm. As the result, waving of a straight line written in the sub-scanning direction is easily recognizable.

In the above, however, because 216.012/215.944= 1.00031, if the modulation frequency for the light source 12 having the radiation wavelength of 800 nm is set to 1.0031 times of that of the light source 11 having the radiation wavelength of 760 nm, the writing width using the light source 12 becomes the same as that with the light source 11, i.e., 215.944 mm. More specifically, the magnification becomes the same for each optical spot and thereby waving of a vertical line written in the sub-scanning direction is effectively prevented. The difference between the writing width of 215.944 and the design value of 216 mm is not significant and therefore, does not causes any problem is practical use of the scanning apparatus.

As described above, the multi-beam scanning apparatus according to the second preferred embodiment of the present invention includes a plurality of light sources 11, 12 which are independently driven to modulate light according to an image signal. A plurality of beams emitted from the light sources 11, 12 are deflected by the common deflector 16 at equiangular velocity. The deflected beams are condensed by the common scanning image forming lens 17 to form optical spots on the scanning surface 18, separated from each other in the sub-scanning direction, and a plurality of lines on the scanning surface 18 are simultaneously scanned with the optical spots at substantially the constant velocity as the deflector 16 rotates.

In the above multi-beam scanning apparatus, the modulation frequencies of the light sources 11, 12 are different from each other so that the writing widths with the light sources 11, 12 become substantially the same.

In the above second preferred embodiment, because the magnification difference between beams from the light sources 11, 12 is mainly caused by the color aberration of the scanning image forming lens 17, if the radiation frequency of the semiconductor lasers 11, 12 are known beforehand, the magnification difference due to the color aberration can be calculated beforehand. Therefore, the writing widths with the light sources 11, 12 can be made substantially the same by making the radiation frequencies for the light sources 11, 12 different from each other according to the respective radiation wavelengths of the light sources 11, 12.

When the magnification difference is caused by reasons other than the color aberration of the scanning image forming lens, the modulation frequencies for the light sources 11, 12 can be determined according to a time period in which each beam from the light sources 11, 12 moves, by being deflected by the deflector 16, between a pair of sensors arranged at both writing start and writing end sides of the scanning surface 18.

Figure 3A:
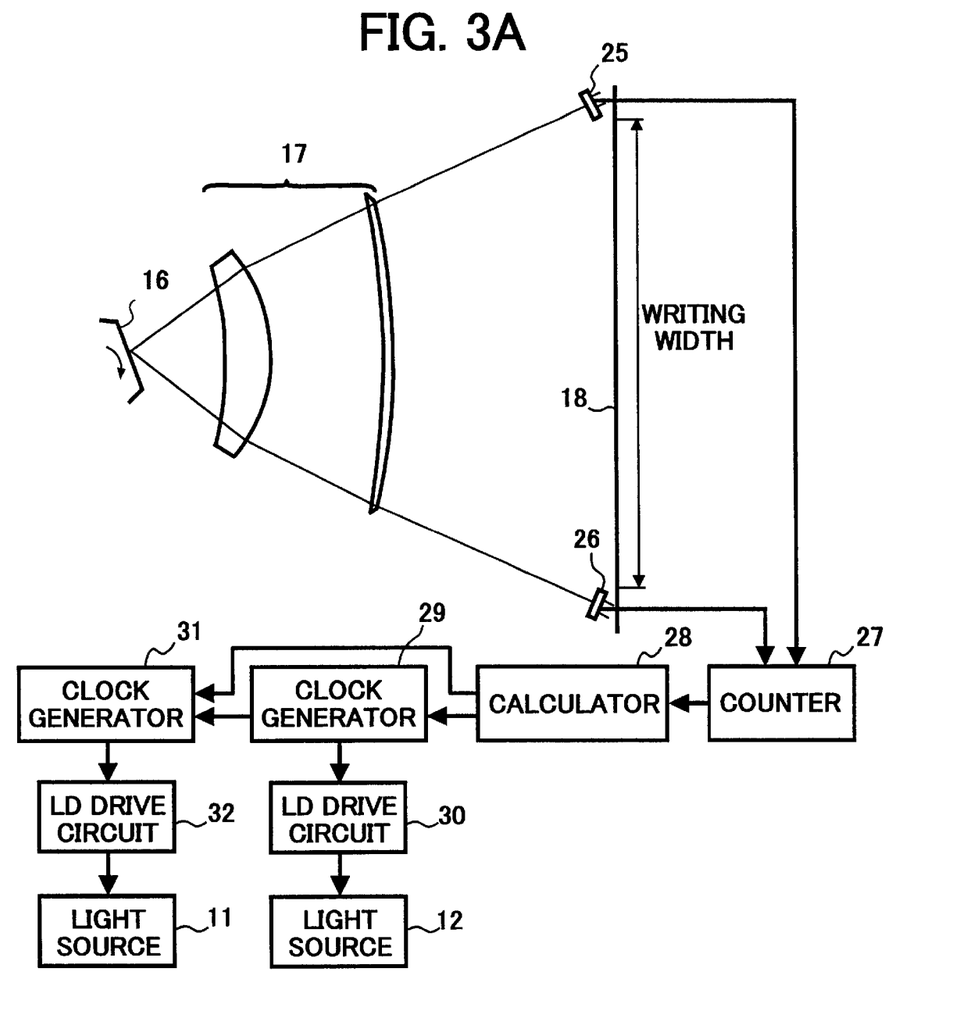
Figure 3B:
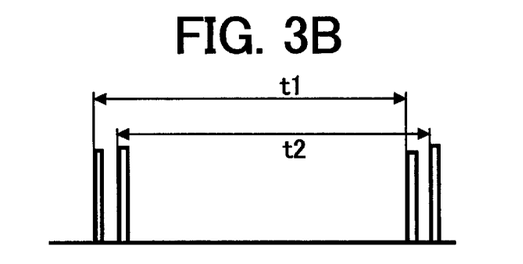

In FIG. 3(a), a pair of sensors 25, 26 are arranged at the writing start and writing end sides of the scanning surface 28, at positions extending from the writing start and end positions, respectively. When each beam from the light sources 11, 12 is detected by the sensors 25, 26, the sensors 25, 26 output signals, respectively, at timings shown in FIG. 3(b). In FIG. 3(b), a time $t_1$ indicates a time for a beam from the light source 11 to move between the sensors 25, 26 and a time $t_2$ indicates a time for each beam from the light source 12 to move between the sensors 25, 26. Accordingly, by making the modulation frequency for the light source 12 ($t_1/t_2$) times of the modulation frequency for the light source 11, or by making the modulation frequency of the light source 11 ($t_2/t_1$) time of the modulation frequency of the light source 12, the writing widths with the beams from the light sources 11, 12 become substantially the same. As a result, waving of a vertical line in the sub-scanning direction can be effectively avoided.

In FIG. 3(a), each output of the sensors 25, 26, is inputted to a counter 27, converted from analog to digital data, and the times $t_1$ and $t_2$ are counted. The count result is input to a calculator 28. The calculator 28 calculates ($t_1/t_2$) and the clock frequency of a clock generator 29 is changed, based upon the result of the calculation, to the frequency of ($t_1/t_2$) times of that of the clock frequency driving the light source 11, which is determined by a clock generator 31 and is applied to a LD driving circuit 32. By driving a LD driving circuit 30 of the light source 12 by the clock frequency generated by the clock generator 29 as the modulation frequency, both the light sources 11, 12 are modulated with desired frequency modulations and thereby, the writing widths of the light sources 11, 12 are made substantially the same.

In the above preferred embodiments, the light sources 11, 12 are arranged close to each other and thereby, beams from the both light sources 11, 12 are not synthesized. However, the present invention can be applied even when a synthesizing device is used for the light sources.

Figure 4:
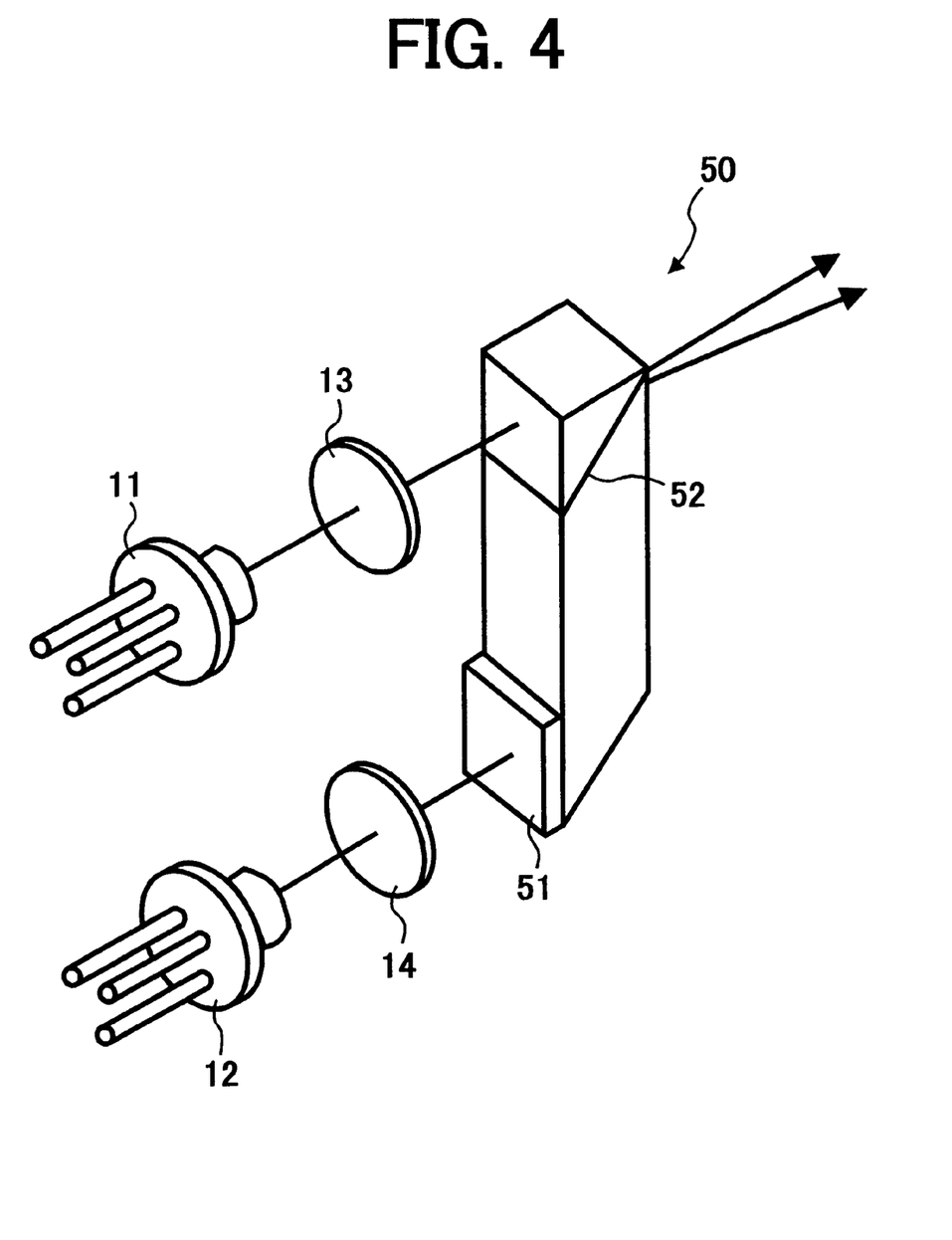
FIG. 4 is a schematic drawing of a beam synthesizing device for a multi-beam scanning apparatus.

For example, as illustrated in FIG. 4, beams from the light sources 11, 12 can be coupled by coupling lenses 13, 14, respectively, and synthesized by a beam synthesizing prism 50.

In FIG. 4, the beam synthesizing prism 50 includes a 1/2 wavelength plate 51 at an incident position for a beam from the coupling lens 14 and also a polarizing separation film 52 inside the beam synthesizing prism 50. A beam from the semiconductor laser 11 is coupled by the coupling lens 13 so as to be incident on the beam synthesizing prism 50, pass through the polarizing separation film 52 and emerge from the beam synthesizing prism 50.

The beam from the light sources 12 is coupled by the coupling lens 14 and is then rotated 90 degrees by the 1/2 wavelength plate 51. The beam from the light source 12 launching into the beam synthesizing prism 50 is reflected by a reflective deflecting plane of the polarizing separation film 52 and thereby is synthesized with the beam from the light source 11.

The present invention can be applied even when the scanning image forming lens 17 is constructed of glass lenses. The present invention is even more effective when more than three light sources are used.

Numerous additional modification and variations of the present invention are possible in light of the above teachings. It is therefore to be understood that within the scope of the appending claims, the present invention may be practiced otherwise than as specifically described herein.

This document claims priority and contains subject matter related to Japanese patent application No. 10-222659 filed in the Japanese Patent Office on Aug. 6, 1998, the entire content of which is hereby incorporated by reference.

What is claimed is:

1. A multi-beam scanning apparatus comprising:
a plurality of light sources arranged to be independently driven to modulate light according to an image signal and to emit a plurality of beams;
a rotating deflector arranged to receive the plurality of beams emitted from the plurality of light sources and to deflect the beams via a reflective deflecting surface thereof;
an image scanning forming lens arranged to receive the deflected beams from the deflector and to condense the deflected beams so as to form optical spots on a scanning surface such that the spots are separated from each other in the sub-scanning direction and such that a plurality of lines on the scanning surface are simultaneously scanned via the optical spots at a substantially constant velocity as the deflector rotates; wherein
a writing angle corresponding to a writing width of the lines written on the scanned surface is θ(rad), a writing density of the dots written on the scanned surface is δ(dpi), a maximum difference of wavelength between the plurality of light sources is Δλ, and a desired writing width corresponding to the writing angle θ with the beam having the desired wavelength λ is L(λ), and the plurality of light sources are such that the value of ΔK, which is defined by ΔK=(1/θ)(dL/dλ), and the maximum difference Δλ of the wavelength between the plurality of light sources satisfy the following condition:

$$0 < \Delta\lambda/[25.4 \times 2/\{\delta \times \Delta K \times \theta\}] \leq 1.$$

2. The multi-beam scanning apparatus according to claim 1, wherein the writing density δ is equal to or greater than 600 dpi.

3. The multi-beam scanning apparatus according to claim 1, wherein the writing density δ is equal to or greater than 1200 dpi.

4. The multi-beam scanning apparatus according to claim 1, wherein the writing density δ is equal to or greater than 2400 dpi.

5. The multi-beam scanning apparatus according to claim 1, wherein the plurality of light sources include a semiconductor laser.

6. The multi-beam scanning apparatus according to claim 1, wherein the plurality of light sources include an LED.

7. The multi-beam scanning apparatus according to claim 1, wherein the deflector is a rotating polygonal mirror.

8. The multi-beam scanning apparatus according to claim 1, wherein the deflector is a flat rotating mirror having a reflecting surface on both sides or one side of the flat mirror.

9. The multi-beam scanning apparatus according to claim 1, wherein at least one of the plurality of light sources has a target wavelength of 780 nm.

10. The multi-beam scanning apparatus according to claim 1, wherein each of the plurality of light sources has a target wavelength of 780 nm.

11. The multi-beam scanning apparatus according to claim 1, wherein the plurality of light sources are arranged to eliminate waviness in a sub scanning direction in a vertical end line written on the scanning surface when the writing density δ is equal to or greater than 600 dpi.

12. The multi-beam scanning apparatus according to claim 1, wherein the image scanning forming lens includes at least two lenses made of a plastic material having an abbe value of greater than about 40 and less than about 80.

13. The multi-beam scanning apparatus according to claim 1, wherein the image scanning forming lens includes at least two lenses each having a thickness $t_1$ at a center portion thereof and a thickness $t_2$ at the edge portion thereof such that $0.3 \leq t_2/t_1 \leq 1.7$.

14. The multi-beam scanning apparatus according to claim 1, wherein the image scanning forming lens includes at least two lenses and one of the first and second lenses has one of negative power and positive power, and the other of the first and second lenses has the other of negative power and positive power.

15. The multi-beam scanning apparatus according to claim 1, wherein the image scanning forming lens includes at least two lenses and a distance $D_1$ from a reflective deflecting surface of the optical deflector to a first surface of the first lens located closest to the optical deflector, and a distance $D_2$ from the reflective deflecting surface of the optical deflector to a surface to be scanned are such that the following condition is satisfied: $D_1/D_2 \geq 0.25$.

16. The multi-beam scanning apparatus according to claim 1, wherein the image scanning forming lens includes at least two lenses and an angle of impingement $\theta_1$, measured relative to the optical axis, of a light beam impinging on the second surface of the first lens located closest to the optical deflector, and an angle of impingement $\theta_2$, measured relative to the optical axis, of a light beam impinging on the surface to be scanned, are such that the following condition is satisfied: $\theta_2/\theta_1 \geq 0.4$.

17. An image forming apparatus comprising:

a plurality of light sources arranged to be independently driven to modulate light according to an image signal and to emit a plurality of beams;

a rotating deflector arranged to receive the plurality of beams emitted from the plurality of light sources and to deflect the beams via a reflective deflecting surface thereof;

an image scanning forming lens arranged to receive the deflected beams from the deflector and to condense the deflected beams so as to form optical spots on a scanning surface such that the spots are separated from each other in the sub-scanning direction and such that a plurality of lines on the scanning surface are simultaneously scanned via the optical spots at a substantially constant velocity as the deflector rotates; wherein a writing angle corresponding to a writing width of the lines written on the scanned surface is $\theta$(rad), a writing density of the dots written on the scanned surface is $\delta$(dpi), a maximum difference of wavelength between the plurality of light sources is $\Delta\lambda$, and a desired writing width corresponding to the writing angle $\theta$ with the beam having the desired wavelength $\lambda$ is $L(\lambda)$, and the plurality of light sources are such that the value of $\Delta K$, which is defined by $\Delta K=(1/\theta)(dL/\lambda))$, and the above maximum difference $\Delta\lambda$ of the wavelength between the plurality of light sources satisfy the following condition:

$$0 < \Delta\lambda/[25.4 \times 2/\{\delta \times \Delta K \times \theta\}] \leq 1.$$

18. A method of forming a multi-beam scanning apparatus, comprising the steps of:

providing a plurality of light sources for emitting a plurality of beams;

arranging a rotating deflector to receive the plurality of beams emitted from the plurality of light sources and to deflect the beams via a reflective deflecting surface thereof;

arranging an image scanning forming lens to receive the deflected beams from the deflector and to condense the deflected beams so as to form optical spots on a scanning surface such that the spots being separated from each other in the sub-scanning direction and such that a plurality of lines on the scanning surface are simultaneously scanned via the optical spots at a substantially constant velocity as the deflector rotates; and selecting the plurality of light sources such that a maximum difference $\Delta\lambda$ of wavelength between the plurality of light sources satisfies the following condition:

$$0 < \Delta\lambda/[25.4 \times 2/\{\delta \times \Delta K \times \theta\}] \leq 1;$$

wherein a writing angle corresponding to a writing width of the lines written on the scanned surface is $\theta$(rad), a writing density of the dots written on the scanned surface is $\delta$(dpi), a maximum difference of wavelength between the plurality of light sources is $\Delta\lambda$, and a desired writing width corresponding to the writing angle $\theta$ with the beam having the desired wavelength $\lambda$ is $L(\lambda)$, and the plurality of light sources are such that the value of $\Delta K$, which is defined by $\Delta K=(1/\theta)(dL/d\lambda)$.

* * * * *